US010486293B2

(12) United States Patent
Verkley

(10) Patent No.: US 10,486,293 B2
(45) Date of Patent: Nov. 26, 2019

(54) DEVICE FOR EXTRACTING CUTTING BIT FROM HOLDER

(71) Applicant: Steven Gerard Verkley, Harrison, OH (US)

(72) Inventor: Steven Gerard Verkley, Harrison, OH (US)

( * ) Notice: Subject to any disclaimer, the term of this patent is extended or adjusted under 35 U.S.C. 154(b) by 1 day.

(21) Appl. No.: 15/383,273

(22) Filed: Dec. 19, 2016

(65) Prior Publication Data

US 2017/0173770 A1 Jun. 22, 2017

Related U.S. Application Data

(60) Provisional application No. 62/268,707, filed on Dec. 17, 2015.

(51) Int. Cl.

*B23P 19/04* (2006.01)
*B25B 27/02* (2006.01)
*B28D 1/18* (2006.01)

(52) U.S. Cl.

CPC ............ *B25B 27/023* (2013.01); *B28D 1/188* (2013.01)

(58) Field of Classification Search

USPC ........................... 29/256, 244, 254, 263, 265
See application file for complete search history.

(56) References Cited

U.S. PATENT DOCUMENTS

| | | | | |
|---|---|---|---|---|
| 155,429 | A * | 9/1874 | Devine | B25C 11/00 254/20 |
| 728,096 | A | 5/1903 | Giltner | |
| 2,503,426 | A | 4/1950 | Tower | |
| 2,639,887 | A * | 5/1953 | Henry | B25C 11/02 254/19 |
| 2,850,265 | A | 9/1958 | Cruthers | |
| 3,097,547 | A | 7/1963 | Krekeler | |
| 3,101,933 | A | 8/1963 | Krekeler | |
| 3,408,724 | A | 11/1968 | Hoeijenbos | |
| 3,529,497 | A * | 9/1970 | Brooks | B25B 27/02 173/91 |
| 3,769,683 | A | 11/1973 | Krekeler | |
| 3,865,437 | A | 2/1975 | Crosby | |
| 4,798,106 | A | 1/1989 | Foster | |

(Continued)

FOREIGN PATENT DOCUMENTS

| | | |
|---|---|---|
| EP | 0817902 B1 | 1/1998 |
| GB | 729796 | 5/1955 |

*Primary Examiner* — Joseph J Hail
*Assistant Examiner* — Shantese L McDonald
(74) *Attorney, Agent, or Firm* — Daniel F. Nesbitt; Hasse & Nesbitt LLC

(57) ABSTRACT

A device for extracting a cutting bit from within a securement hole in cutting equipment. The device has a base body having an open base end that contact the cutting equipment that surrounds the cutting bit. An elongated drive body having a threaded member with a threaded bore, rotatively contacts the base body, and a threaded post having a threaded portion is threaded within the threaded bore of the elongated drive body, and has a lower end extending into the base body. A pair of bit jaws are attached to the lower end of the threaded post, each having an in-turned ledge for engaging a peripheral groove of the cutting bit. By rotating the drive body, the threaded post is drawn axially upwardly, and with it the pair of bit jaws, to withdraw the cutting bit from the hole in the cutting equipment.

19 Claims, 7 Drawing Sheets

(56) References Cited

U.S. PATENT DOCUMENTS

| | | | | |
|---|---|---|---|---|
| 5,098,167 | A | 3/1992 | Latham | |
| 5,582,468 | A | 12/1996 | Latham | |
| 5,802,692 | A | 9/1998 | Philippe | |
| 5,884,979 | A | 3/1999 | Latham | |
| 6,526,641 | B1 | 3/2003 | Latham | |
| 6,601,277 | B1 | 8/2003 | Swanson | |
| 6,823,574 | B2 | 11/2004 | Swanson | |
| 6,910,252 | B2 | 6/2005 | Draggie et al. | |
| 7,415,754 | B1 | 8/2008 | Cargill et al. | |
| 7,520,570 | B2 | 4/2009 | Sansone et al. | |
| 7,658,368 | B2 | 2/2010 | Laun | |
| 7,980,604 | B2 | 7/2011 | Punaro | |
| 8,181,322 | B2 | 5/2012 | Lehnert et al. | |
| 8,256,081 | B2 | 9/2012 | Fridman | |
| 8,601,662 | B1 * | 12/2013 | Rankin ................. | E21C 35/197<br>29/255 |
| 2005/0278917 | A1 | 12/2005 | Klann | |
| 2009/0019679 | A1 | 1/2009 | Hahn et al. | |
| 2011/0278513 | A1 * | 11/2011 | Esposito ................. | B25C 11/02<br>254/18 |

* cited by examiner

DEVICE FOR EXTRACTING CUTTING BIT FROM HOLDER

CROSS-REFERENCE TO RELATED APPLICATION

This application claims the benefit of U.S. Provisional Patent Application No. 62/268,707, filed on Dec. 17, 2015, the disclosure of which is incorporated herein by reference.

FIELD OF THE INVENTION

The present invention generally relates to a tool for retracting and replacing cutting its used in a cutting equipment, such as a roadway reclaiming equipment, or an auger

BACKGROUND OF THE INVENTION

Cutting bits are used in the heavy construction industry to cut and bore through rock and earth in the construction of highways, bridges, tunnels, dams and buildings of all types. Typical roadway surface reclaiming machines disclosed in the prior art include rotary driven cylindrical drums with holders holding fixed one of more cutting bits which scarify and mine the top portion of an asphaltic read surface. While several styles of drums have been employed, at least some styles have included an array of cutting bit holders fixed usually by a peripheral weld to the drum surface. Replaceable cutting bits are received within the cutting bit holders which can be periodically replaced as needed. Examples of prior art cutting bit holders are to be found, as non-limiting examples, in U.S. Pat. Nos. 3,865,437, 5,884,979, 5,582,468 and 5,098,167, the disclosures of which are incorporated by reference in their entireties. Other examples appear as the prior art cited in these patents.

During the operation of such roadway surface reclaiming machines, the cutting bits are exposed to extreme frictional and impact forces. Although these bits are typically manufactured from hardened materials, wear and damage to the cutting bits is inevitable. As the cutting bits wear, the efficiency of the equipment that relies upon them is reduced, slowing the reclamation process and increasing the burdens imposed upon the rutting hit holders, the cutting drums and the equipment that drives these devices. This leads to delay and increased costs for additional maintenance and labor.

However, typical road surface reclamation devices use a large number of cutting bits, thus, the replacement of the cutting bits is a time consuming process, largely because the manual removal and reinstallation cutting bits is often tedious and slow. Thus, replacement of the bits is expensive, both requiring the extended attention of one or more trained mechanics, and because all road reclamation operations must cease during replacement of the cutting bits. When circumstances dictate that cutting bits must be replaced during regularly scheduled reclamation activities, hundreds of labor hours can be lost.

Accordingly, what has been sought has been a tool for removing the cutting bits from their holders or directly from the cutting equipment in a tune effective manner.

However it is often very difficult to remove cutting bits from cutting bit holders. Cutting bits are firmly affixed when they are installed. In operation, the extreme stress, thermal conditions, and environmental contamination to which these products can be exposed can tightly bind these devices.

Thus, what is needed is an effective tool for separating even tightly bound cutting bits from their holders or from the cutting equipment in a time effective manner.

It might appear that a simple solution to this problem lies in providing, a powerful device that can exert exceptional amounts of force upon the cutting bit and bit holder in order to separate these components. However, great care must be exercised in the application of large amounts of force to this equipment because the individual cutting bit holding elements in rotary driven cylindrical cutters are often aligned in a known manner to maximize the mining activity and facilitate removal of mine material from the kerf created by the cutting operation. In certain alignment regimens, cutting bit holding elements on one side of the drum are aligned differently than cutting bit holding elements on the opposite side of the drum. Adherence to these alignment regimens is critical to the overall efficiency of the road reclamation process. Because of this, simply providing a tool that uses substantial amounts of force to separate these components will not meet the design objectives unless this force is properly directed and channeled to prevent damage to the cutting bit holders and the drum.

Accordingly, what is needed is an effective tool for separating even tightly bound cutting bits from their bit holders or the cutting equipment in a time effective manner while limiting the risk of damage to the cutting bit holder and the cutting equipment.

In situations where substantial amounts of force are required to separate the cutting bit from the cutting bit holder or the cutting equipment, it is occasionally the case that the cutting bit and cutting bit holder separate rapidly. When this occurs it is possible that the cutting bit will he accelerated and will gain some freedom of motion during the removal process. It is, therefore, necessary that the freedom of motion available to the cutting bit is restricted in order to limit the possibility that the cutting bit will unexpectedly contact the user of the tool, the cutting bit holder or the drum.

U.S. Pat. No. 6,526,641, the disclosure of which is incorporated by reference in its entirety, describes a tool for extracting cutting bits that employs a retractor device using a fluid-powered cylinder, where the can be a pneumatic or hydraulic fluid.

Notwithstanding, what is needed is an effective hand-operated tool for separating tightly bound cutting bits from their holders in a time effective manner while limiting the risk of damage to the cutting bit holder and the cutting equipment during the separation process.

SUMMARY OF THE INVENTION

The present invention provides a tool for separating a cutting bit from a cutting bit holder, or directly from the cutting equipment, used in connection with a rotary cutting assembly for use, as non-limiting example, in a roadway surface reclaiming machine or in an auger.

The present invention is directed toward assisting the replacement of the cutting bits, more particularly it is directed to providing a means of quickly and effectively extracting and changing cutting bits from the cutting bit holders or from the cutting equipment, such as an auger. The present invention accomplishes this objective by providing an improved, manually-operated, pulling mechanism.

A cutting bit holder is a separable component that links and secures a cutting bit to a driven and rotating cutting equipment. The cutting bit holder is fixed to the surface of the cutting equipment and aligned in a predetermined pattern. In some cutting equipment, the cutting bit can be secured into a securement hole directly in the cutting equipment. The holder serves as a buffer between the cutting surfaces of the cutting bit and the driven surface. In extreme situations, they can separate from the driven surface before forces accumulate that will damage or deform the driven surface. They also permit the user of the equipment to replace the cutting bits as necessary without repeated modification of the driven surface. One non-limiting example of a cutting bit holder is described in U.S. Pat. No. 5,884,979, the disclosure of which is incorporated by reference in its entirety.

The device includes a base body, an upper drive body, a threaded post extending between the base body and the drive body, and a pair of bit jaws.

The base body provides a stable base for the tool during use. The base body also serves to as a brace against an extracting force acting upon the cutting bit. The base body includes as hollow cylindrical wall having a base end that has an opening into the hollow space, and a top end having an aperture there through. The base body is of sufficient lateral dimension to capture the cutting bit with the two opposed bit jaws affixed thereto, and is of sufficient axial dimension to retain and capture of the cutting bit between a secured position within the cutting bit holder and an extracted position. The base body also surrounds the cutting bit during its extraction to limit the possibility of it from flying free due to the significant forces involved.

A pair of bit jaws are provided that are pivotably attached on opposite sides of the lower end of the threaded post, and have a lower end that extends downward and below the lower end of the threaded post. The lower end of the bit jaw has an in-turned ledge for engaging and securing into an annular groove of the cutting bit from opposite sides thereof. The lower end of the bit jaws can pivot away from the axial centerline for positioning the bit jaws around the cutting bit the securement. Once the bit jaws are secured in position around the cutting bit, the base body can be lowered down to envelop the bit jaws and cutting bit. The inside surface of the cylindrical wall of the base body is configured to confront and confine the bit jaws from pivoting outwardly away from the centerline, thus preventing the in-turned ledges from disengaging or slipping off the annular groove of the cutting bit.

The threaded post extends from within and through the aperture at the top end of the base body, and into an, upper drive body. Once the bit jaws are secured to the cutting bit within the base body, the threaded post is drawn axially away from the base end of the base body by rotating the drive body around the threaded post. The drive body includes a threaded member having a threaded bore in which a threaded portion of the threaded post is disposed, and a bottom end having an aperture there through, through which the threaded post extends. When the drive body is rotated the advancing helical threads of the rotating threaded member draw the threaded portion of the threaded post upward, and with it, the opposed pair of bit jaws and the cutting bit secured there between.

The lower end of the drive body has a contact surface that confronts and contacts a mating contact surface on the top end of the base body. The drive body has a top drive end that can be driven in rotation by a lever having a drive end. The top end can include a square through hole that is configured for a square socket driver.

In an aspect of the invention, a length of the threaded bore of the drive body is at least the diameter of the threaded portion of the threaded rod. More particularly, the length of the threaded bore is at least 25% longer than the diameter of the threaded rod, including at least 50% longer, at least 100% longer, and at least 150% longer, than the diameter of the threaded rod.

In a further aspect of the invention, the threaded bore of the drive body can includes at least 10 threads, including at least 15 threads.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

DETAILED DESCRIPTION OF THE INVENTION

Figure 1:
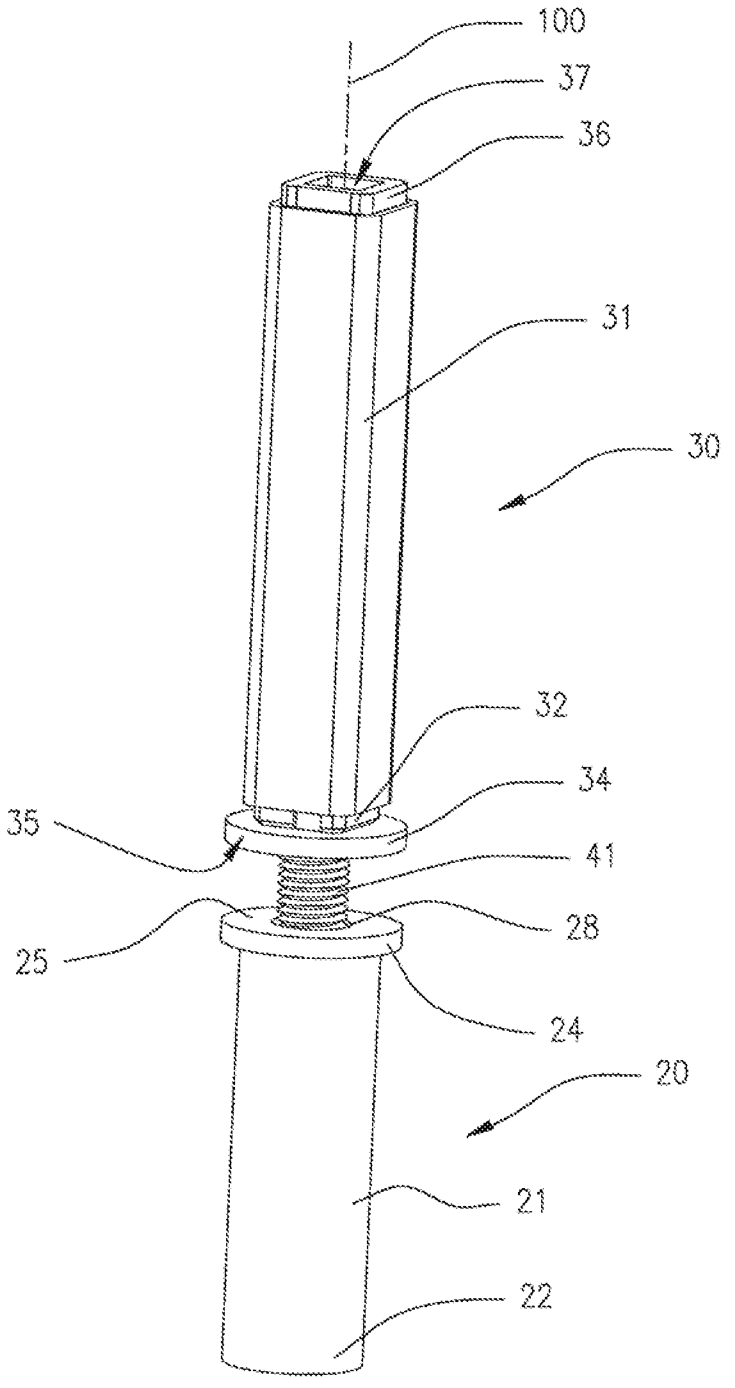
FIG. 1 shows a tool of the present invention for separating a cutting bit from a cutting bit auger with a base body, a drive body and a threaded post.
Figure 2:
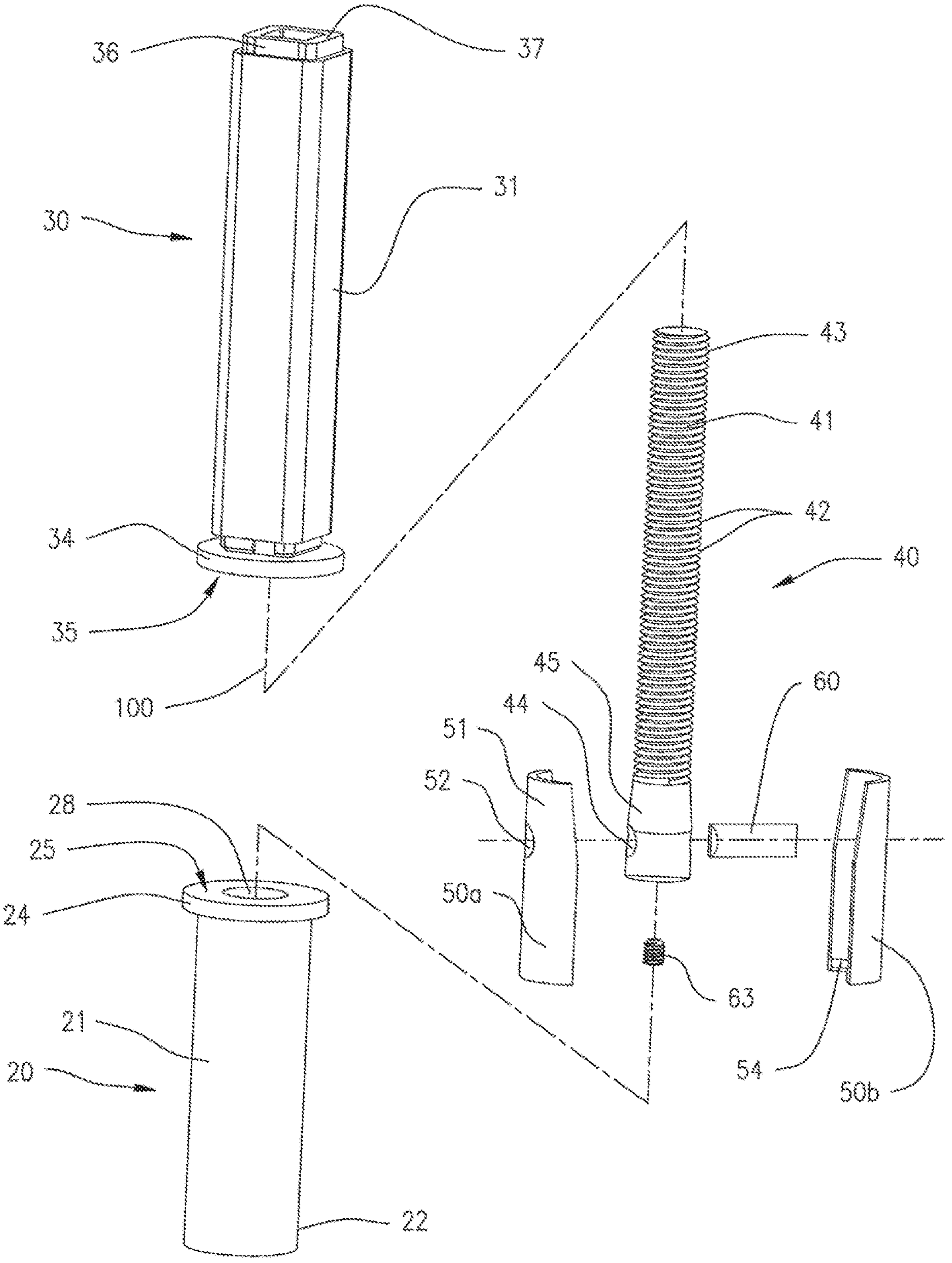
FIG. 2 is an exploded view of the tool, showing the base body, the drive body and the threaded post, and further illustrating a pair of bit jaws and a pin to fix the bait jaws to the bottom end of the threaded post.
Figure 3:
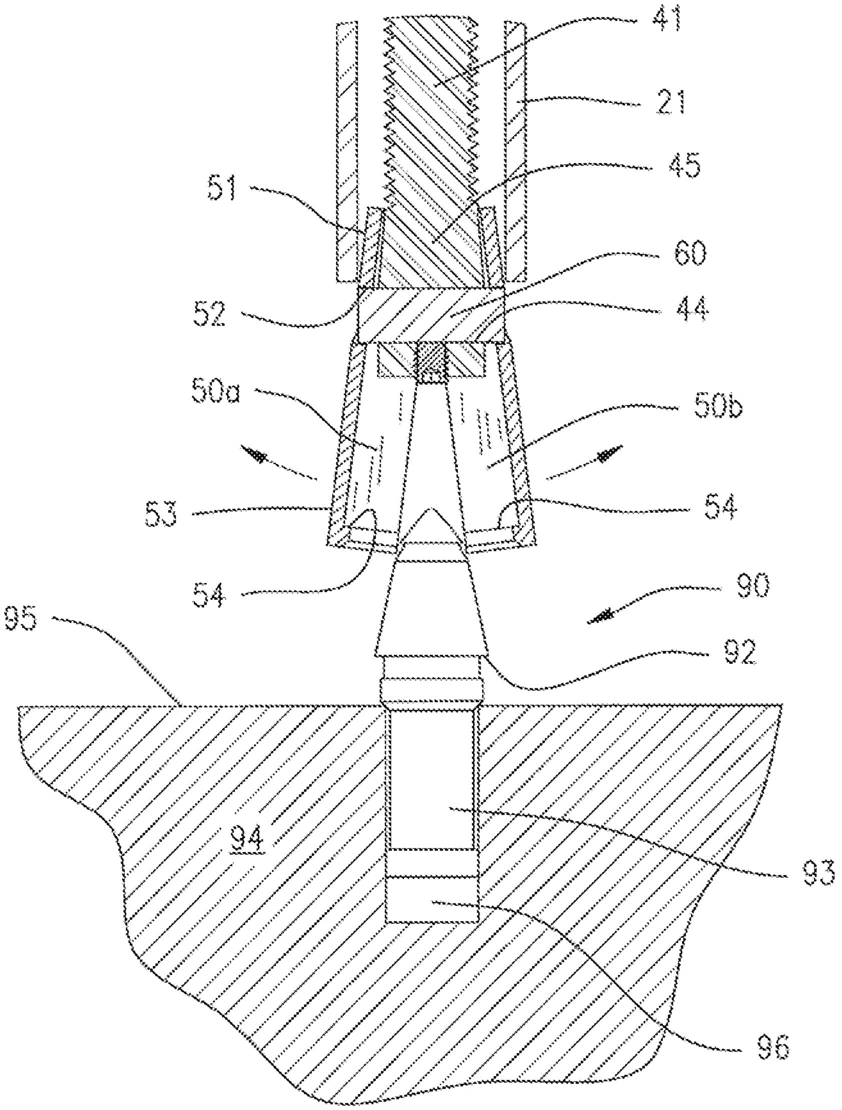
FIG. 3 shows a sectional view of the lower end of the base body of the tool with the bit jaws positioned in an expanded position for surrounding a cutting bit anchored into a securement hole in the auger.
Figure 7:
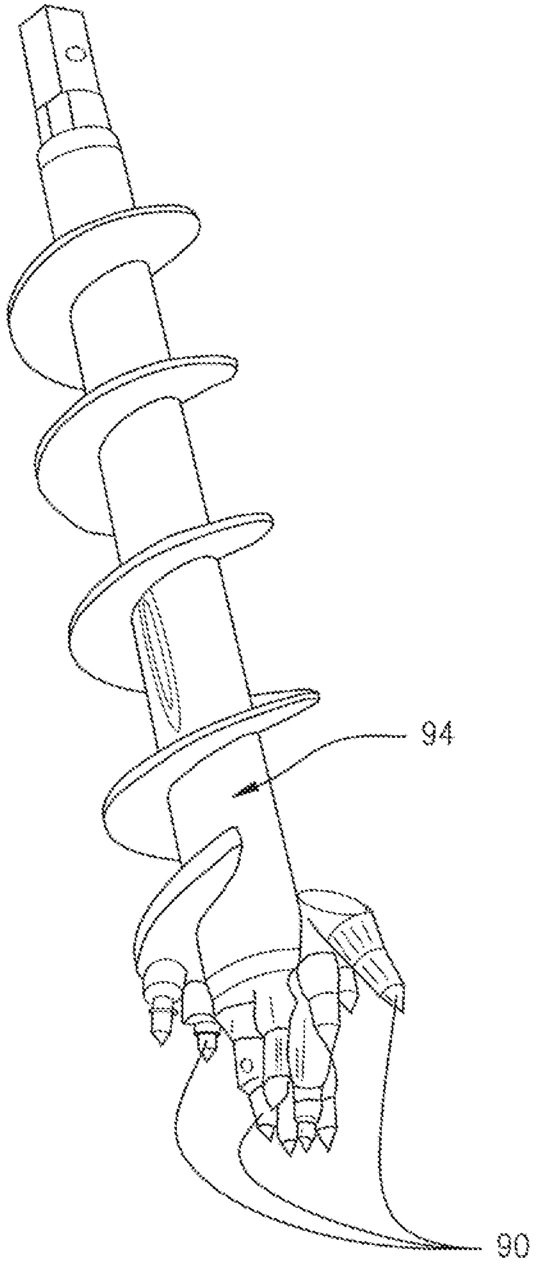
FIG. 7 shows an auger cutting equipment including cutting bits.

A tool 10 for separating a cutting bit 90 from an auger 94 is shown in FIGS. 1-3. An auger 94 including cutting bits 90 is shown in FIG. 7. The cutting bit 90 (FIG. 3) has a base end 93 that is inserted into a retaining hole 96 of a cutting bit holder or cutting equipment, illustrated as an auger 94, and an upper end protruding above a surface 95 of a portion of the auger 94, Cutting bits 90 and the auger 94 are known in the prior art. These cutting bits 90 are typically provided with engagement surfaces, such as an annular peripheral groove 92, that provides control surfaces on the cutting bit 90 to facilitate attachment of a gripping element, illustrated as bit jaws 50, for removal of the cutting bit 90 from the auger 94. The bit jaws 50 include an in-turned ledge 54 for engaging and securing into the annular peripheral groove 92 from opposite sides of the cutting bit 90. The in-turned ledge has an arcuate that follows the outer curvature of the wail of the bit jaw 50. The in-turned ledges 54 provide simple lever-type devices used on the surface of the grooves 92 to provide some mechanical advantage in generating the upwardly-directed force required to remove the cutting bit 90 from the hole 96.

The tool 10 includes a base body 20 that provides an outer frame and serves as a brace for placement of the tool against a surface of the cutting equipment or holder. The base body 20 has opposed ends. A first end 22 engages the outer surface of the auger 94, and a top end 24. The ends 22 and 24 are separated longitudinally by a cavity or inner space circumscribed by cylindrical wall 21 of the base body 20. The diameter of cylindrical base body 20 is sufficient to capture or surround the cutting bit 90 with the two opposed bit jaws 50 affixed thereto (shown in FIG. 5), and yet is limited in diameter sufficiently to restrain the bit jaws 50 in secured engagement with the cutting bit 90. The cavity or inner space is of sufficient axial dimension to retain the captured cutting bit between a secured position of the cutting bit 90 within the hole 96 (shown in FIG. 5) and an extracted position with the cutting bit 90 drawn at least partially out of the hole (shown in FIG. 6).

Figure 4:
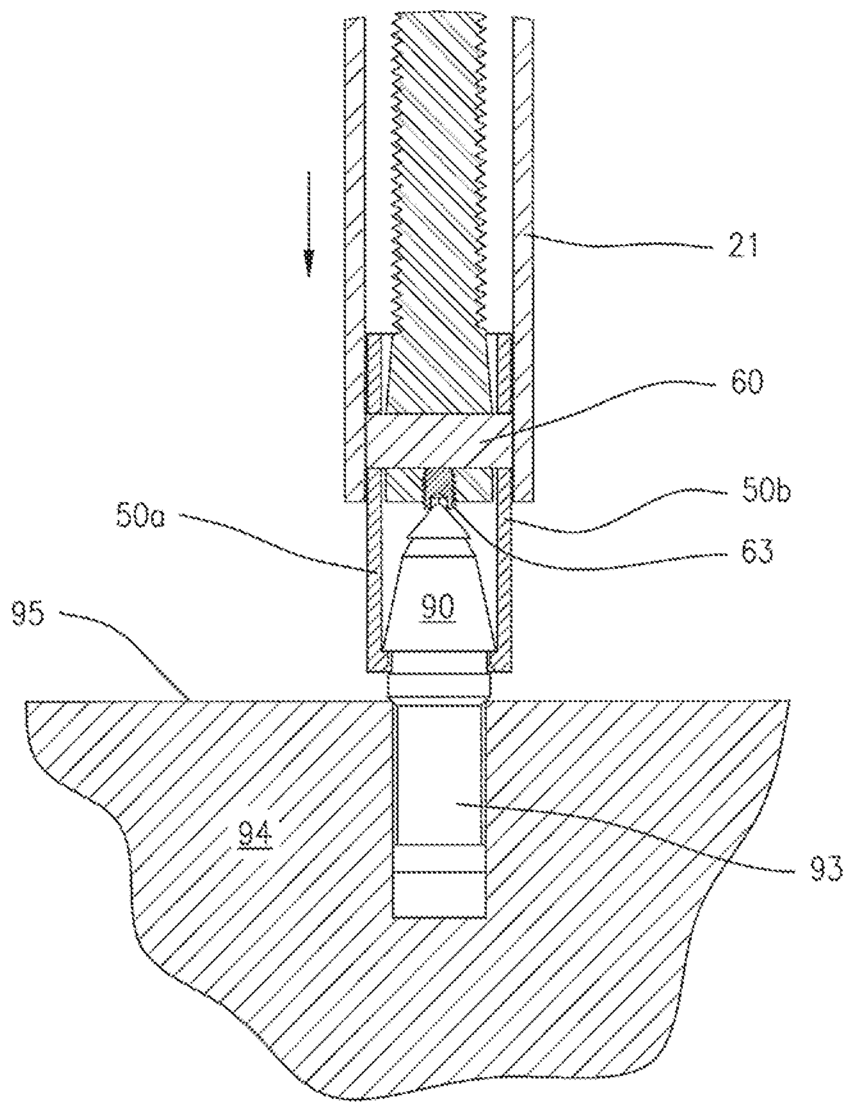
FIG. 4 shows a sectional view of the lower end of the base body of the tool with the bit jaws positioned in engagement with the cutting bit.

The tool 10 also includes jaws 50, including a pair of bit jaws 50*a*,50*b*. The bit jaws 50 have an arcuate wail with an inner surface that, when engaged with the cutting bit, conforms to the outer cylindrical surface of the cutting bit 90. The lower end 53 has an in-turned ledge 54 that extends either continuously or intermittently along the lower end, for engaging and securing into the annular peripheral groove 92 of the cutting bit 90. The lower end 53 of the bit jaws 50 extends downward and below the lower end 45 of the threaded post 40. In the illustrated embodiment, there is a pair of jaws 50*a*,50*b* disposed on opposite sides of the cutting bit. Each jaw 50 extends up to half the circumference of the outer surface of the cutting bit. Alternatively, additional jaws can be provided, spaced in between the initial pair of jaws 50. The top end 51 of the bit jaws 50 (50*a*,50*b*) has an aperture 52. A cylindrical pin 60 extends horizontally through a bore 44 formed in the lower end 45 of a threaded post 40. The extending opposite ends 61, 62 of the pin 60 engage the apertures 52 in the top ends 51 of the jaws 50 for exerting upward, extracting force on the bit jaws 50, and with them, the cutting bit 90. The ends 61,62 of the pin 60 through die apertures 52 also provides a means for pivoting the lower end 53 of the bit jaws 50 laterally outward and away from the axial centerline 100 as shown in FIG. 3, to disengage and re-engage the jaws 50 with the cutting bit 90, as shown in FIG. 4.

Figure 5:
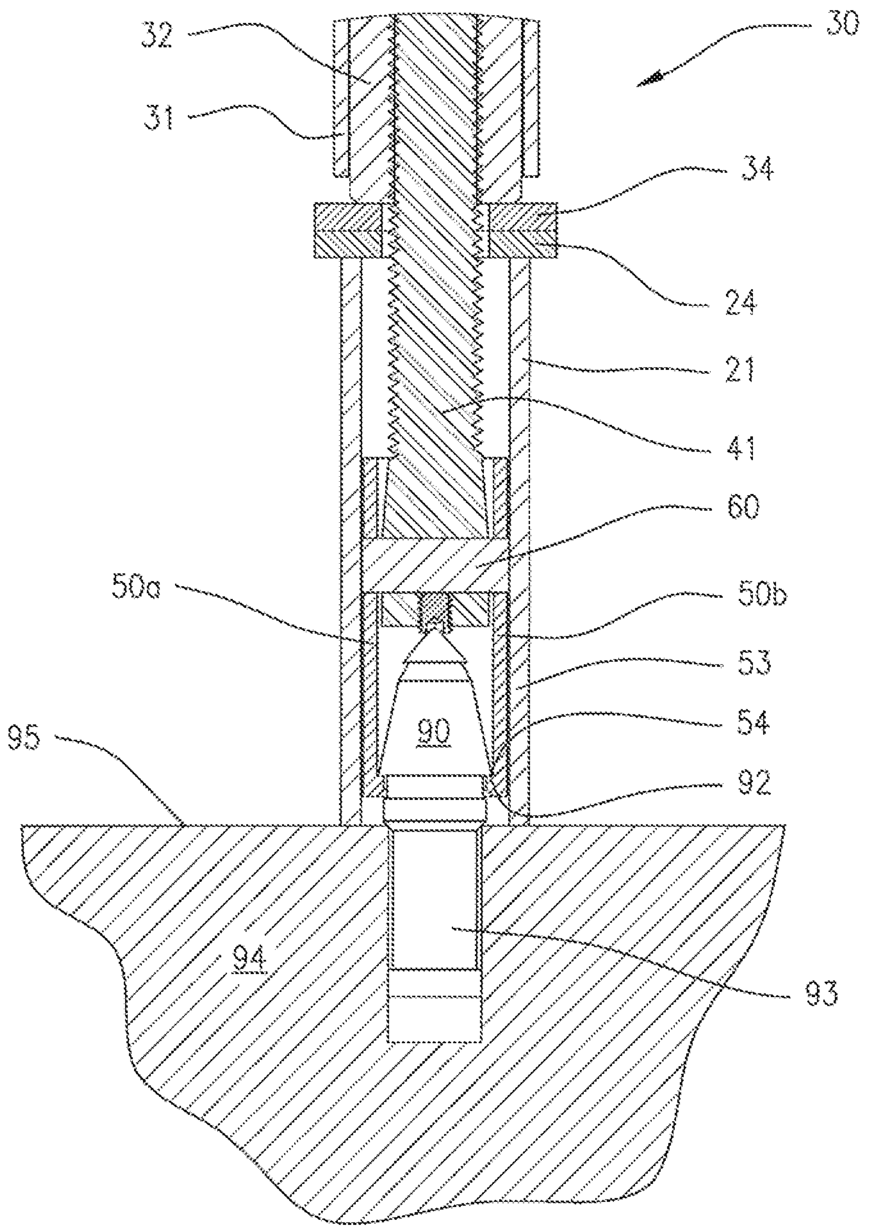
FIG. 5 is a sectional view of the tool with the base body braced against the auger, and confining the bit jaws in their engagement with the cutting bit.
Figure 6:
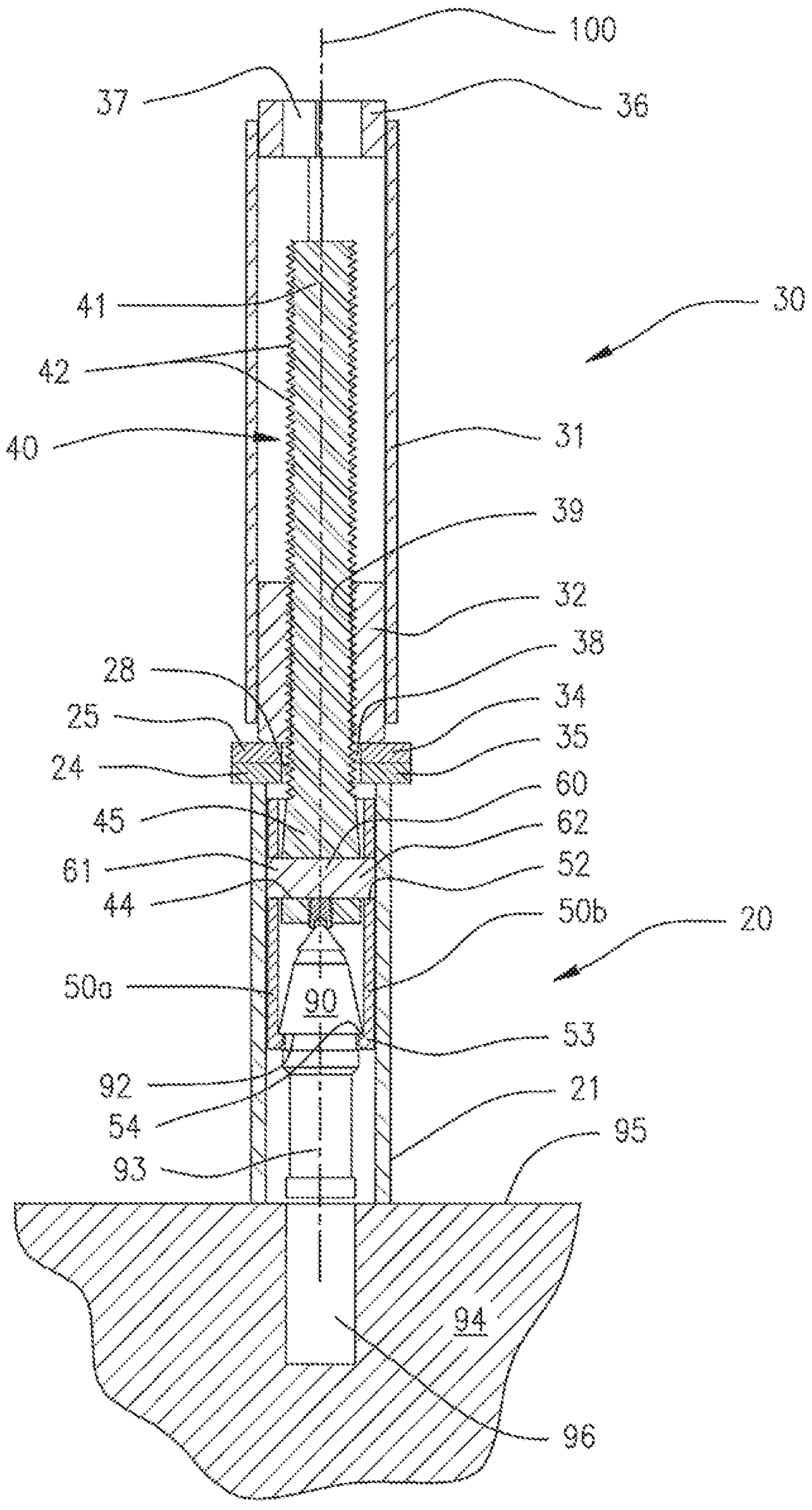
FIG. 6 is a sectional view of the tool after rotating the drive body to draw up the threaded post and the bit jaws, to extract cutting bit from the securement hole.

The threaded post 40 includes a threaded portion 41 that extends from its lower end 45. The threaded portion 41 extends through the aperture 28 at the top end 24 of the base body 20, and upward through an aperture 38 in a bottom end 34 of, and into, a drive body 30 as shown in FIG. 5. The drive body 30 includes a cylindrical wall 31, and a threaded member 32, near its bottom end 34. The threaded member 32 has a threaded bore 39 extending axially along line 100 therethrough, with the threaded portion 41 disposed therein.

The threaded post 40 provides a screw means for the drive body 30 to be rotated relative to the base body 20. The rotation of the drive body 30 relative to the base body 20 draws axially and upwardly the threaded post 40 within the base body 20 and through the drive body 30. Operation of the device intends that the threaded post 40 is drawn upward, but does not rotate relative to the base body 20. The helical threads of the rotating threaded bore 39 draw the threaded post 40 upward through the threaded member 32. The torque required to rotate the drive body 30 can be applied at a top drive end 36. The top drive end 36 can be driven in rotation by a lever having a drive end (not shown), and can include a square through hole that is configured for a square socket driver.

Due to the very high force required to extract the cutting bit 90, the axial forces and pressures exerted by the threads 42 of the threaded portion 41 upon the threads of the threaded bore 39 are likewise very high. The increased of the length of the threaded bore 39, relative to conventional nuts, reduces proportionally the force and pressure exerted per helical thread. The longer length of the threaded bore 39 allows the application of higher torque, and greater extracting force, upon the cutting bit, without damaging or destroying the threads of the threaded post 40 or the threaded bore 39 of the dive both 30.

In the illustrated embodiment, the length of the threaded bore 39 of the drive body 30 is about 100% of, or twice, the diameter of the threaded portion 41 of the threaded rod 40. As illustrated, the number of threads in the threaded bore 30 is 18. More or fewer threads can be provided. The thread pitch (helical angle), thread count per length, and coarseness of the threads can be selected to suit the specific need.

During operation of the tool, and the rotating by torque of the drive body 30 relative to the base body 20, significant friction is generated at the interface of bottom end 34 of the drive body 30 rotating against the top end 24 of the base body 20. To reduce rotational friction between the bodies, the top end 24 of the base body 20 has an annular contact surface 25 of the planar area that outlines the aperture 28, and the bottom end 34 of the drive body 30 has a confronting and mating annular contact surface 35 of the planar area that outlines the aperture 38. The confronting contact surfaces 25 and 35 are smooth, and preferably polished, to reduce rotational friction, and wearing of the elements. During operation, a lubricant or slipping agent, such as greases, can be applied between the confronting surfaces to reduce friction.

Although the invention has been described in detail with reference to the illustrated preferred embodiment, variations and modifications exist within the scope and spirit of the invention as described and is claimed in the following claims.

I claim:

1. A device for extracting a cutting bit protruding from within a retaining hole in a surface of a cutting bit holder or cutting equipment, the cutting bit having an upper end protruding above the surface, and a peripheral groove in the upper end, comprising:

a. an elongated base body including an outer cylindrical wall having a cavity in an axial dimension along an axial centerline, an open base end and a top end comprising a contact surface having an aperture;

b. an elongated drive body extending along the axial centerline, including a cylindrical wall having a bottom end and a top end, a threaded member fixed in place within the cylindrical wall and comprising threads that define a threaded bore along the axial centerline, and a contact surface having an aperture, the contact surface is disposed at the bottom end of the cylindrical wall and is configured for rotative contact with the contact surface of the top end of the base body, and a top drive end;

c. a threaded post extending along the axial centerline, the threaded post including:

i. a threaded portion, threaded within the threaded bore of the threaded member of the elongated drive body, wherein the threaded portion extends from the drive body into the base body and non-contactingly through the respective apertures in the contact surfaces of the bottom end of the drive body and of the top end of the base body, whereby the base body and its contact surface is separable axially from the drive body and its contact surface, and ii. a lower end fixed to and extending from a lower end of the threaded portion, movable axially within the cavity of the base body, the lower end of the threaded post including a pivoting means;

wherein the threaded portion is configured to move axially within both the base body and the drive body, and non-rotatively relative to the base body, in response to rotation of the drive body and the threaded member relative to the base body; and d. a pair of bit jaws, each bit jaw including an arcuate wall having an upper end attached pivotally to the pivoting means of the lower end of the threaded post, and a lower end extending below opposite sides of the lower end of the threaded post, the lower end including an in-turned ledge that is arcuate up to half a circumference of the outer surface of the cutting bit, for following and engaging the peripheral groove in the upper end of the cutting bit on opposite sides of the cutting bit, and the lower end being free to pivot laterally to and away from the axial centerline of the threaded post, wherein when the pair of bit jaws are disposed within the cavity of the base body, and an inside surface of the outer cylindrical wall of the base body confronts and confines the actuate walls of the bit jaws from pivoting outwardly away from the center, the respective in-turned ledges of the pair of jaws are engaged with the annular groove of the cutting bit, and are prevented from disengaging or slipping off from the annular groove of the cutting bit by the inside surface of the outer cylinder wall of the base body, and wherein, with the base end of the base body in non-rotative contact with the surface of the cutting bit holder or the cutting equipment, and with the bit jaws in the engaged position secured to the cutting bit, the pair of bit jaws move axially within the cavity of the base body in response to rotation of the drive body relative to the base body, between:

1) a first engaged position with the engaged cutting bit disposed within the retaining hole; and 2) a second extracted position with the engaged cutting bit drawn at least partially from the retaining hole in the cutting bit holder or the cutting equipment.

2. The device according to claim 1 where a length of the threaded bore of the drive body is at least the diameter of the threaded portion of the threaded rod.

3. The device according to claim 2 where the length of the threaded bore is at least 25% longer than the diameter of the threaded rod.

4. The device according to claim 3 where the length of the threaded bore is at least 50% longer than the diameter of the threaded rod.

5. The device according to claim 4 where the length of the threaded bore is at least 100% longer than the diameter of the threaded rod.

6. The device according to claim 5 where the length of the threaded bore is at least 150% longer than the diameter of the threaded rod.

7. The device according to claim 1 where the threaded bore includes at least 10 threads.

8. The device according to claim 7 where the threaded bore includes at least 15 threads.

9. The device according to claim 1 where the contact surface of the base body and the contact surface of the drive body are confronting annular surfaces.

10. The device according to claim 1 where the contact surfaces are polished surfaces.

11. The device according to claim 1 where the base body is a circular cylinder, and the drive body is a square cylinder.

12. The device according to claim 11 where the top drive end includes a square through-hole configured for a square socket driver.

13. The device according to claim 1 where the cutting bit holder is the cutting equipment.

14. The device according to claim 11 wherein the outer wall the base body has a diameter that is sufficiently large to surround the two opposed bit jaws engaged with the cutting bit, and is sufficiently limited to restrain the opposed bit jaws in secured engagement against the cutting bit.

15. The device according to claim 1 wherein the lower end of the threaded post is configured to extend to the base end of the base body, to a position at which the respective lower ends of the pair of bit jaws extend outside the cavity and beyond the open base end of the base body, and can pivot laterally and away from the axial centerline of the threaded post for engaging the pair of jaws with the cutting bit retained within the retaining hole.

16. The device according to claim 15 wherein the pair of bit jaws are configured to pivot between a disengaged position that positions the lower end of each bit jaw around and on opposites sides of the cutting bit, and an engaged position that hugs the arcuate walls of the bit jaws around an outer cylindrical surface of the cutting bit, and secures the in-turned ledge at the lower end of each bit jaw in the peripheral groove in the upper end of the cutting bit on opposite sides of the cutting bit.

17. The device according to claim 16 wherein the lower end of the threaded post has a bore therethrough transverse to the axial centerline, and the upper end of each bit jaw has an aperture, the device further including a pin having opposed ends, the pin configured to extend through the bore in the lower end of the threaded post, wherein the opposite ends of the pin engage the apertures in the upper ends of the bit jaws, to attach the bit jaws to the threaded post, and to provide a means for pivoting the bit jaws.

18. The device according to claim 1 wherein the pair of bit jaws are configured to pivot between a disengaged position that positions the lower end of each bit jaw around and on opposites sides of the cutting bit, and an engaged position that hugs the arcuate walls of the bit jaws around an outer cylindrical surface of the cutting bit, and secures the in-turned ledge at the lower end of each bit jaw in the peripheral groove in the upper end of the cutting bit on opposite sides of the cutting bit.

19. The device according to claim 1 wherein the top drive is disposed within the top end of the cylinder wall and configured to be driven in rotation to rotate the drive body relative to the base body.

* * * * *